United States Patent
Spaeth et al.

(10) Patent No.: US 7,374,078 B2
(45) Date of Patent: *May 20, 2008

(54) METHOD AND SYSTEM FOR MANAGING TOKEN IMAGE REPLACEMENT

(75) Inventors: Paul Spaeth, Half Moon Bay, CA (US); Douglas Jones, San Francisco, CA (US); Bryan Shimko, Scottsdale, AZ (US); James G. Gordon, Eastwood (AU); Kim Madore, Markham (CA); Marc Black, St. Paul, MN (US); James Mazour, St. Louis Park, MN (US); Michael Salters, Plymouth, MN (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/540,020

(22) Filed: Sep. 29, 2006

(65) Prior Publication Data

US 2007/0023498 A1    Feb. 1, 2007

Related U.S. Application Data

(63) Continuation of application No. 10/661,228, filed on Sep. 12, 2003, now Pat. No. 7,121,456.

(60) Provisional application No. 60/410,555, filed on Sep. 13, 2002.

(51) Int. Cl.
*G06K 17/00* (2006.01)
(52) U.S. Cl. .................. 235/375; 707/204; 707/202; 705/17; 235/380
(58) Field of Classification Search .............. 235/375, 235/382, 485–487, 380; 707/8, 104, 200, 707/1, 204, 202; 705/204, 202, 17, 39, 41
See application file for complete search history.

(56) References Cited

U.S. PATENT DOCUMENTS 3,935,933 A    2/1976   Tanaka et al.
4,011,433 A    3/1977   Tateisi et al.

(Continued)

FOREIGN PATENT DOCUMENTS

AU    200039412 A1    12/2000
BE       1002756 A6     5/1991

(Continued)

OTHER PUBLICATIONS

"Internet based secure transactions using encrypting applets and cgi-scripts Independent of browser or server capabilities"; 1998, *IBM Research Disclosure*, No. 410116, pp. 800-801.

* cited by examiner

*Primary Examiner*—Edwyn Labaze
(74) *Attorney, Agent, or Firm*—Townsend and Townsend and Crew LLP

(57) ABSTRACT

A system for managing token image replacement is provided. The system includes a remote server, a personal computer (PC) connected to the remote server, a smartcard that can be read by the PC, and a card image server. Using application logic and rules, the remote server is able to read the card image on the smartcard and determine if the card image on the smartcard needs to be updated. If an indicator on the smartcard is set to "update", the remote server then retrieves a backup card image that corresponds to the card from the card image server. The remote server forwards the backup card image to the PC which, in turn, writes the backup card image including transaction information to the smartcard. Once the backup card image is written onto the smartcard, the indicator in the smartcard is then reset to ensure that subsequent interactions with the system would not initiate an update.

17 Claims, 2 Drawing Sheets

U.S. PATENT DOCUMENTS

| | | |
|---|---|---|
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,162,638 A | 11/1992 | Diehl et al. |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,521,966 A | 5/1996 | Friedes et al. |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,691,525 A | 11/1997 | Aoki et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,546 A | 6/1998 | Handelman et al. |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,082 A | 12/1998 | Murakami |
| 5,845,259 A | 12/1998 | West et al. |
| 5,854,581 A | 12/1998 | Mori et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |

| | | |
|---|---|---|
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |
| 6,012,635 A | 1/2000 | Shimada et al. |
| 6,014,634 A | 1/2000 | Scroggie et al. |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |
| 6,052,690 A | 4/2000 | de Jong |
| 6,052,785 A | 4/2000 | Lin et al. |
| 6,055,509 A | 4/2000 | Powell |
| 6,061,660 A | 5/2000 | Eggleston et al. |
| 6,067,526 A | 5/2000 | Powell |
| 6,070,147 A | 5/2000 | Harms et al. |
| 6,073,238 A | 6/2000 | Drupsteen |
| 6,076,068 A | 6/2000 | DeLapa et al. |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |
| 6,122,631 A | 9/2000 | Berbec et al. |
| 6,129,274 A | 10/2000 | Suzuki |
| 6,138,907 A | 10/2000 | Mori et al. |
| 6,144,948 A | 11/2000 | Walker et al. |
| 6,151,586 A | 11/2000 | Brown |
| 6,151,587 A | 11/2000 | Matthias |
| 6,154,751 A | 11/2000 | Ault et al. |
| 6,161,870 A | 12/2000 | Blank |
| 6,164,549 A | 12/2000 | Richards |
| 6,170,061 B1 | 1/2001 | Beser |
| 6,173,269 B1 | 1/2001 | Solokl et al. |
| 6,173,891 B1 | 1/2001 | Powell |
| 6,179,205 B1 | 1/2001 | Sloan |
| 6,179,710 B1 | 1/2001 | Sawyer et al. |
| 6,183,017 B1 | 2/2001 | Najor et al. |
| 6,185,541 B1 | 2/2001 | Scroggie et al. |
| 6,189,100 B1 | 2/2001 | Barr et al. |
| 6,189,787 B1 | 2/2001 | Dorf |
| 6,193,152 B1 | 2/2001 | Fernando et al. |
| 6,195,666 B1 | 2/2001 | Schneck et al. |
| 6,210,276 B1 | 4/2001 | Mullins |
| 6,216,014 B1 | 4/2001 | Proust et al. |
| 6,216,204 B1 | 4/2001 | Thiriet |
| 6,220,510 B1 | 4/2001 | Everett et al. |
| 6,222,914 B1 | 4/2001 | McMullin |
| 6,230,143 B1 | 5/2001 | Simons et al. |
| 6,237,145 B1 | 5/2001 | Narasimhan et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,266,647 B1 | 7/2001 | Fernandez |
| 6,267,263 B1 | 7/2001 | Emoff et al. |
| 6,269,158 B1 | 7/2001 | Kim |
| 6,270,011 B1 | 8/2001 | Gottfried |
| 6,279,112 B1 | 8/2001 | O'Toole, Jr. et al. |
| 6,282,516 B1 | 8/2001 | Giuliani |
| 6,292,785 B1 | 9/2001 | McEvoy et al. |
| 6,292,786 B1 | 9/2001 | Deaton et al. |
| 6,296,191 B1 | 10/2001 | Hamann et al. |
| 6,299,530 B1 | 10/2001 | Hansted et al. |
| 6,321,208 B1 | 11/2001 | Barnett et al. |
| 6,385,723 B1 | 5/2002 | Richards |
| 6,390,374 B1 | 5/2002 | Carper et al. |
| 6,480,935 B1 | 11/2002 | Carper et al. |
| 6,549,773 B1 | 4/2003 | Linden et al. |
| 6,549,912 B1 | 4/2003 | Chen |
| 6,553,494 B1 | 4/2003 | Glass |
| 6,564,215 B1 | 5/2003 | Hsiao et al. |
| 6,612,490 B1 | 9/2003 | Herrendoerfer et al. |
| 6,681,995 B2 | 1/2004 | Sukeda et al. |
| 6,689,345 B2 | 2/2004 | Jager Lezer |
| 6,779,115 B1 | 8/2004 | Naim |
| 6,792,536 B1 | 9/2004 | Teppler |
| 6,880,752 B2 | 4/2005 | Tarnovsky et al. |
| 6,976,165 B1 | 12/2005 | Carpentier et al. |
| 6,980,670 B1 * | 12/2005 | Hoffman et al. ............ 382/115 |
| 7,051,923 B2 | 5/2006 | Nguyen |
| 2001/0011250 A1 * | 8/2001 | Paltenghe et al. ............ 705/41 |
| 2001/0045451 A1 * | 11/2001 | Tan et al. .................... 235/375 |
| 2002/0002468 A1 | 1/2002 | Spagna et al. |
| 2002/0004783 A1 * | 1/2002 | Paltenghe et al. ............ 705/41 |
| 2002/0010757 A1 | 1/2002 | Granik et al. |
| 2002/0076051 A1 | 6/2002 | Nii |
| 2002/0077904 A1 * | 6/2002 | Ali .............................. 705/14 |
| 2002/0107797 A1 | 8/2002 | Combaluzler |
| 2003/0131041 A1 | 7/2003 | Dinker et al. |
| 2006/0011719 A1 * | 1/2006 | Lehtonen et al. ............ 235/380 |

FOREIGN PATENT DOCUMENTS

| | | |
|---|---|---|
| CA | 2293944 | 8/2000 |
| CA | 2267041 | 9/2000 |
| CA | 2317138 A1 | 1/2002 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 0203424 A2 | 12/1986 |
| EP | 0292248 A2 | 11/1988 |
| EP | 0475837 A1 | 3/1992 |
| EP | 0540095 A1 | 5/1993 |
| EP | 0658862 A2 | 6/1995 |
| EP | 0675614 A1 | 10/1995 |
| EP | 0682327 A2 | 11/1995 |
| EP | 0875841 A2 | 11/1998 |
| EP | 0936530 A1 | 8/1999 |
| EP | 0938050 A2 | 8/1999 |
| EP | 0938051 A2 | 8/1999 |
| EP | 0944007 A2 | 9/1999 |
| EP | 0949595 A2 | 10/1999 |
| EP | 0982692 A2 | 3/2000 |
| EP | 0984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |

| | | | | | | | |
|---|---|---|---|---|---|---|---|
| FR | 2772957 | A1 | 6/1999 | WO | WO 00/68797 | A1 | 11/2000 |
| FR | 2793048 | A1 | 11/2000 | WO | WO 00/68902 | A1 | 11/2000 |
| FR | 2794543 | A1 | 12/2000 | WO | WO 00/68903 | A1 | 11/2000 |
| FR | 2796176 | A1 | 1/2001 | WO | WO 00/69183 | A2 | 11/2000 |
| FR | 2804234 | A1 | 7/2001 | WO | WO 00/75775 | A2 | 12/2000 |
| GB | 2331381 | A | 5/1999 | WO | WO 00/77750 | A1 | 12/2000 |
| GB | 2343091 | A | 4/2000 | WO | WO 01/04851 | A1 | 1/2001 |
| GB | 2351379 | A | 12/2000 | WO | WO 01/06341 | A1 | 1/2001 |
| GB | 2355324 | A | 4/2001 | WO | WO 01/08087 | A1 | 2/2001 |
| JP | 2000-112864 | A | 4/2000 | WO | WO 01/13572 | A1 | 2/2001 |
| JP | 2000-181764 | A | 6/2000 | WO | WO 01/15397 | A1 | 3/2001 |
| JP | 2001-202484 | A | 7/2001 | WO | WO 01/18633 | A1 | 3/2001 |
| JP | 2001-236232 | A | 8/2001 | WO | WO 01/18746 | A1 | 3/2001 |
| KR | 0039297 | A | 5/2001 | WO | WO 01/29672 | A1 | 4/2001 |
| KR | 0044823 | A | 6/2001 | WO | WO 01/33390 | A2 | 5/2001 |
| KR | 0058742 | A | 7/2001 | WO | WO 01/40908 | A1 | 6/2001 |
| KR | 0021237 | A | 3/2002 | WO | WO 01/42887 | A2 | 6/2001 |
| WO | WO 90/16126 | A1 | 12/1990 | WO | WO 01/44900 | A2 | 6/2001 |
| WO | WO 96/25724 | A1 | 8/1996 | WO | WO 01/44949 | A2 | 6/2001 |
| WO | WO 96/38945 | A1 | 12/1996 | WO | WO 01/47176 | A1 | 6/2001 |
| WO | WO 96/42109 | A1 | 12/1996 | WO | WO 01/50229 | A2 | 7/2001 |
| WO | WO 97/05582 | A1 | 2/1997 | WO | WO 01/52575 | A1 | 7/2001 |
| WO | WO 97/10562 | A1 | 3/1997 | WO | WO 01/55955 | A1 | 8/2001 |
| WO | WO 97/39424 | A1 | 10/1997 | WO | WO 01/59563 | A1 | 8/2001 |
| WO | WO 98/02834 | A1 | 1/1998 | WO | WO 01/61620 | A1 | 8/2001 |
| WO | WO 98/09257 | A1 | 3/1998 | WO | WO 01/65545 | A2 | 9/2001 |
| WO | WO 98/20465 | A1 | 5/1998 | WO | WO 01/67694 | A1 | 9/2001 |
| WO | WO 98/43169 | A2 | 10/1998 | WO | WO 01/71648 | A2 | 9/2001 |
| WO | WO 98/43212 | A1 | 10/1998 | WO | WO 01/71679 | A2 | 9/2001 |
| WO | WO 98/52153 | A2 | 11/1998 | WO | WO 01/73530 | A2 | 10/2001 |
| WO | WO 99/10824 | A1 | 3/1999 | WO | WO 01/73533 | A1 | 10/2001 |
| WO | WO 99/16030 | A1 | 4/1999 | WO | WO 01/78020 | A1 | 10/2001 |
| WO | WO 99/19846 | A2 | 4/1999 | WO | WO 01/80563 | A1 | 10/2001 |
| WO | WO 99/44172 | A1 | 9/1999 | WO | WO 01/84377 | A2 | 11/2001 |
| WO | WO 99/45507 | A1 | 9/1999 | WO | WO 01/84474 | A2 | 11/2001 |
| WO | WO 99/49415 | A2 | 9/1999 | WO | WO 01/84512 | A1 | 11/2001 |
| WO | WO 99/49426 | A1 | 9/1999 | WO | WO 01/88705 | A1 | 11/2001 |
| WO | WO 00/39714 | A1 | 7/2000 | WO | WO 02/06948 | A1 | 1/2002 |
| WO | WO 00/46665 | A2 | 8/2000 | WO | WO 02/10962 | A1 | 2/2002 |
| WO | WO 00/54507 | A1 | 9/2000 | WO | WO 02/14991 | A2 | 2/2002 |
| WO | WO 00/57315 | A2 | 9/2000 | WO | WO 02/15037 | A1 | 2/2002 |
| WO | WO 00/57613 | A1 | 9/2000 | WO | WO 02/21315 | A1 | 3/2002 |
| WO | WO 00/62265 | A1 | 10/2000 | WO | WO 02/29577 | A2 | 4/2002 |
| WO | WO 00/62472 | A1 | 10/2000 | WO | WO 02/088895 | A2 | 11/2002 |
| WO | WO 00/67185 | A1 | 11/2000 | | | | |

METHOD AND SYSTEM FOR MANAGING TOKEN IMAGE REPLACEMENT

CROSS-REFERENCES TO RELATED APPLICATION

The present application is a continuation application of U.S. patent application Ser. No. 10/661,228, filed on Sep. 12, 2003, which claims the benefit of priority under 35 U.S.C. § 119 from U.S. Provisional Patent Application Ser. No. 60/410,555, entitled "METHOD AND SYSTEM FOR MANAGING CARD IMAGE REPLACEMENT", filed on Sep. 13, 2002, both of these applications are hereby incorporated by reference in their entirety for all purposes.

BACKGROUND OF THE INVENTION

The present invention generally relates to card image replacement and, more specifically, to a method and system for managing card image replacement on a smartcard via a computer network.

The emergence of secured tokens, such as smartcards, has allowed a much higher volume of information to be stored on a transaction card. For instance, in addition to the typical cardholder information, a smartcard is able to store a variety of different programs including, for example, a loyalty program of which the cardholder is a participant. Furthermore, unlike cards with magnetic stripes which can only retain static information, the use of a smartcard allows information stored thereon to be changed dynamically. As a result, there is often a need to update or replace contents of a smartcard.

Moreover, smartcards often need to be replaced for any number of reasons. Due to the transit time needed for replacement cards to reach their respective cardholders, these cards (such as a chip card that has the capability to receive updated information) generally do not contain the latest transaction information. This is because transactions conducted with the old card often occur during the transit period, i.e., the period between the issuance of the replacement card and the actual receipt of that card by its owner.

There are many different situations in which replacement cards are needed. One common situation is when an old card is about to expire. Typically when issuers, such as banks, replace a card, they do so by sending a replacement card to the cardholder in advance of the expiration date. Once the replacement card has been personalized and sent for delivery to the cardholder, there is a period of time that the cardholder may be conducting transactions on his/her existing card. In the case of a chip card, a cardholder may make transactions that result in information being stored on the chip during the time the replacement card is in transit. As a result, when the replacement card is delivered to the cardholder, the most recent transaction information would not be captured on the replacement card.

Another common situation in which a replacement card is desired is when a card has been lost or stolen. Similar to the situation described above, the replacement card would not contain the most recent transaction information. Furthermore, in the case of lost or stolen cards, unauthorized and/or illegal transactions may have occurred. Therefore, it would be important to include the correct authorized transaction information on the replacement card.

Hence, it would be desirable to provide a method and system that is capable of facilitating card image replacement so as to allow replacement cards to be updated with the latest accurate transaction information in an intelligent and efficient manner.

BRIEF SUMMARY OF THE INVENTION

A system for managing token image replacement is provided. In an exemplary embodiment, the system includes a remote server, a personal computer (PC) connected to the remote server, a smartcard that can be read by the PC, and a card image server. Using application logic and rules, the remote server is able to read the card image on the smartcard and determine if the card image on the smartcard needs to be updated. If an indicator on the smartcard is set to "update", the remote server then retrieves a backup card image that corresponds to the card from the card image server. The remote server forwards the backup card image to the PC which, in turn, writes the backup card image including transaction information to the smartcard. Once the backup card image is written onto the smartcard, the indicator in the smartcard is then reset to ensure that subsequent interactions with the system would not initiate an update.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
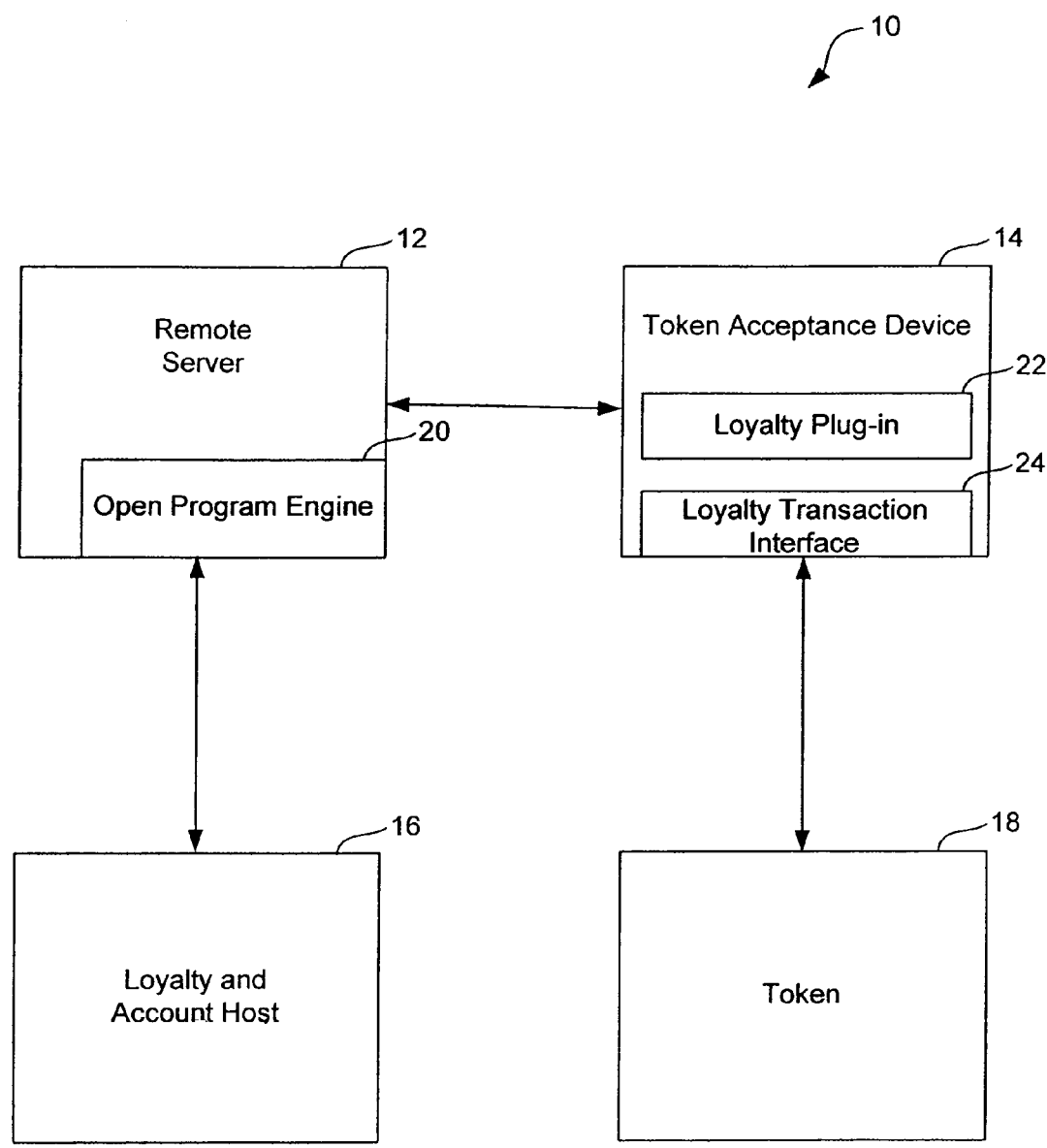
FIG. 1 is a simplified block diagram illustrating an exemplary embodiment of the present invention.

The present invention in the form of one or more exemplary embodiments will now be described. FIG. 1 is a simplified block diagram illustrating an exemplary embodiment of the present invention. Referring to FIG. 1, according to one exemplary embodiment, the system 10 includes a remote server 12, a loyalty and account host 16, a token acceptance device 14 and a token 18. In other alternative exemplary embodiments (not shown), multiple instances of each component of the system 10 may be included. Based on the disclosure and teachings provided herein, a person of ordinary skill in the art will know of other ways and/or methods to construct various system configurations in accordance with the present invention.

The loyalty and account host 16 maintains information on a number of loyalty programs and respective accounts relating to the loyalty programs. For example, the loyalty and account host 16 maintains backup token images of tokens 18 participating in the loyalty programs. A token image includes information relating to the holder of the token 18 or the loyalty program participant such as, loyalty programs that the holder is eligible to participate in and the associated account information, loyalty transactions completed, rewards earned and reward redeemed, etc. Optionally, the loyalty and account host 16 may maintain two or more backup token images for each token 18, depending on the particular design and/or constraints. The backup token images need not be identical. Various dated versions of the backup token images can be maintained. For example, a first backup token image for the token 18 may reflect information as of a first date, and a second backup token image for the same token may reflect information as of a second date. Based on the disclosure and teachings provided herein, a person of ordinary skill in the art will appreciate other ways and/or methods that can be used to maintain backup token images in accordance with the present invention. The loyalty and account host 16 can be implemented as a server or a computer that is capable of maintaining data or other information including token images, etc.

In one exemplary implementation, the token 18 is a smartcard. It should be understood that the token 18 includes other types of portable devices including, for example, a cellular phone, a personal digital assistant, a pager, a payment card (such as a credit card and an ATM card), a security card, an access card, smart media, a transponder and the like.

The token acceptance device 14 is a device that is capable of communicating with the token 18 including, for example, a point-of-sale device, a cellular phone, a personal digital assistant (PDA), a personal computer (PC), a tablet PC, a handheld specialized reader, a set-top box, an electronic cash register, a virtual cash register, a kiosk, a security system, an access system, and the like. In one exemplary embodiment, the token acceptance device 14 further includes a loyalty plug-in 22 and a loyalty transaction interface 24. As will be further described below, the loyalty plug-in 22 and the loyalty transaction interface 24 cooperate with one another as well as the remote server 12 to facilitate token image replacement.

The remote server 12 functions in cooperation with the loyalty and account host 16 and the token acceptance device 14 to facilitate maintenance of the token 18, as will be further described below. The remote server 12 is connected to the token acceptance device 14 and the loyalty and account host 16 via respective communication links, such as, a dialup connection, a leased line, a computer network including the Internet, and the like. The remote server 12 further includes an open program engine (OPE) 20. The OPE 20 contains application logic and rules that are used to manage and process loyalty transactions in connection with loyalty programs that are associated with the token 18. In addition, the application logic and rules in the OPE 20 are also used to facilitate maintenance of the token 18.

The system 10 operates in the following exemplary manner to complete token image replacement on the token 18. First, the token 18 is inserted into the token acceptance device 14 so that information on the token 18 can be retrieved. For example, using the application logic and rules, the remote server 12 is able to read the token image on the token 18 and determine if the token image on the token 18 needs to be updated. If an indicator on the token 18 is set to "update", the remote server 12 then retrieves a backup token image that corresponds to the token 18 from the loyalty and account host 16.

The indicator on the token 18 may be set to "update" in a number of ways. For example, in one situation, the indicator may be set by the issuer of the token 18 when the issuer forwards the token 18 to the holder. At the time the holder receives the token 18, the token 18 may be blank or contain minimal information. Hence, when the holder uses the token 18 to conduct loyalty program activities, the latest token image can be uploaded to the token 18 to keep the token 18 current. In another situation, occurrence of a certain event might trigger the setting of the indicator to "update" so that additional information pertaining to the triggering event can be uploaded to the token 18.

As mentioned above, optionally, there may be two or more backup token images that can be uploaded to the token 18. Logic may be included to allow the appropriate backup token image to be uploaded. Various criteria can be used to determine which backup token image is to be uploaded. For example, a backup token image from a specific date may need to be uploaded to the token 18.

Once the backup token image is retrieved from the loyalty and account host 16, the backup token image is forwarded by the remote server 13 to the token acceptance device 14. The token acceptance device 14 then updates or writes the backup token image to the token 18. Typically, the entire backup token image is uploaded to the token 18. However, it should be noted that in some situations the token acceptance device 14 may choose to update the token 18 with selected portions of the backup token image. In other words, all or portions of the backup token image can be uploaded onto the token 18. This may be necessary to ensure that certain information that may have been added to the token 18 during prior transactions is not overwritten.

Once the backup token image is written onto the token 18, the indicator in the token 18 is then reset to ensure that subsequent interactions with the system 10 will not initiate an update.

Figure 2:
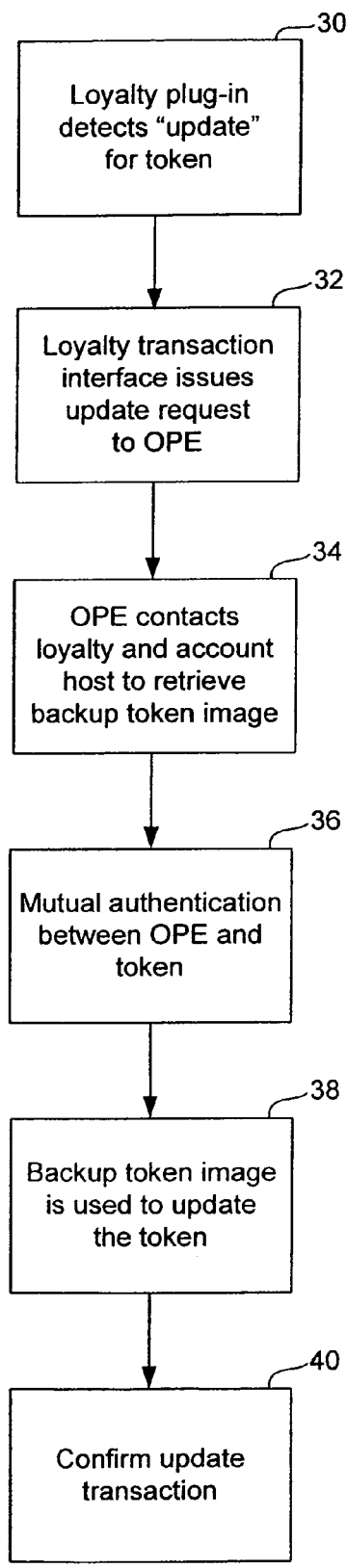
FIG. 2 is a flow diagram further illustrating an exemplary method for managing token image replacement in accordance with the present invention.

FIG. 2 is a flow diagram further illustrating an exemplary method for managing token image replacement in accordance with the present invention. At 30, the loyalty plug-in 22 detects that an "update" is needed for the token 18. At 32, the loyalty plug-in 22 communicates with the loyalty transaction interface 24 which, in turn, issues an update request to the OPE 20. The update request includes information that is needed to identify the token 18. At 34, upon receiving the update request, the OPE 20 contacts the loyalty and account host 16 to retrieve the appropriate backup token image. The appropriate backup token image is determined based on information included in the update request. At 36, upon receiving the backup token image, the OPE 20 engages in mutual authentication with the token 18 with the help of the loyalty transaction interface 24. At 38, upon successful mutual authentication, the backup token image is passed by the OPE 20 to the loyalty plug-in 22 via the loyalty transaction interface 24. The loyalty plug-in 22 then updates the token 18 with the backup token image. At 40, the loyalty plug-in 22 then confirms the loyalty transaction interface 24 of the successful update. The loyalty transaction interface 24, in turn, forwards the confirmation to the OPE 20. The OPE 20 stores the confirmation for subsequent reporting to the loyalty and account host 16.

The backup token image can also be provided to the token 18 in other exemplary manners. For example, the cardholder may contact a customer service representative to request an update (i.e., the backup token image) for the token 18. The customer service representative then, in turn, forwards an email to the cardholder with the backup token image attached. The backup token image can then be provided to the token 18. In another instance, the cardholder may contact the remote server 12 to request an update for the token 18. The remote server 12 may send the backup token image to a specific location, such as, a store. The store may have, for example, kiosks that allow the backup token image to be retrieved. The cardholder may then be instructed to visit the specific location to retrieve the backup token image. Based on the disclosure and teachings provided herein, a person of ordinary skill in the art will know of other ways and/or methods to provide the backup token image to a token in accordance with the present invention.

In an exemplary embodiment, the system 10 as described above is implemented using a number of hardware and/or software components. It should be understood that in addition to the configurations described above, these components may be distributed in other manners, integrated or modular or otherwise, amongst the various components of the system 10 to achieve the same collective functionality, depending on factors such as the system design and resource constraints. For example, the open program engine 20 and the loyalty and account host 16 can be combined into a single remote server; and the loyalty plug-in 22 and the loyalty transaction interface 24 can be combined into single loyalty client. Based on the disclosure and teachings provided herein, a person of ordinary skill in the art will know of other ways and/or methods to implement the functionality provided by the present invention in various forms and/or configurations.

The system 10 of the present invention as described above can be deployed in a number of applications. In one exemplary application, the system 10 can be used to update a newly issued smartcard with the most recent transaction information. After the newly issued smartcard is sent but before it is received by the cardholder, the cardholder may conduct transactions using his old smartcard during this interim period. Information relating to these transactions is captured on the backup smartcard image which is maintained by the loyalty and account host 16. This information, however, could not have been and is not stored on the newly issued smartcard. In addition, to improve security reasons associated with potential loss during transit, the new smartcard can be rendered blank or contain minimal information when it is sent to the cardholder. Subsequently, when the cardholder receives the new smartcard, the system 10 allows the new smartcard to be updated with the backup smartcard image which includes the most recent transaction information captured during the interim period.

In another exemplary application, the system 10 can be used to update a newly issued smartcard with selected transaction information. This application is similar to the one described above except that selected transaction information is desired as opposed to the most recent. This may be desired in a situation where the new smartcard is issued to replace an old smartcard that has been stolen or lost. In this situation, the most recent transaction information may reflect fraudulent transactions. Hence, the new smartcard may need to be updated with information that existed at a certain point in time which is not necessarily the most recent. By using the system 10, the cardholder can update the new smartcard with the appropriate backup smartcard image to reflect only legitimate transactions that have been incurred. Based on the disclosure and teachings provided herein, a person of ordinary skill in the art will appreciate other ways and/or methods to deploy the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A method comprising:
   communicating with a portable token, said portable token containing an image corresponding to a first date;
   sending information about the portable token to a server in communication with a host comprising loyalty or reward information to retrieve a backup token image, said backup token image corresponding to a second date;
   receiving the backup token image; and
   updating the portable token with the backup token image that was sent from the server.

2. The method of claim 1 wherein the portable token is in the form of a card.

3. The method of claim 1 wherein the backup token image includes only selected transaction information.

4. The method of claim 1 wherein the portable token and the server engage in a mutual authentication process.

5. The method of claim 1 wherein the portable token also comprises loyalty or reward information.

6. The method of claim 5 wherein the portable token is in the form of a card.

7. The method of claim 1 wherein the portable token comprises loyalty information.

8. A token acceptance device configured to perform the method of claim 1.

9. A token acceptance device configured to perform the method of claim 2.

10. A method comprising:
    communicating with a portable token, said portable token containing an image corresponding to a first date;
    sending information about the portable token to a server to retrieve a backup token image, said backup token image corresponding to a second date;
    receiving the backup token image from the server; and
    updating the portable token with the received backup token image that was sent from the server, wherein the backup token image includes selected transaction information.

11. The method of claim 10 wherein the portable token is in the form of a card.

12. The method of claim 10 wherein the portable token and the server engage in a mutual authentication process.

13. The method of claim 10 wherein the portable token also comprises loyalty or reward information.

14. The method of claim 13 wherein the portable token is in the form of a card.

15. The method of claim 14 wherein the portable token comprises loyalty information.

16. A token acceptance device configured to perform the method of claim 10.

17. A token acceptance device configured to perform the method of claim 11.

* * * * *